ns are disclosed in U.S. Patents Nos. 2,076,295, 2,273,367, 2,384,387, 2,559,891 and 2,813,780, British Patent No. 768,762, Italian Patent No. 590,887, Belgian Patents Nos. 527,694, 565,130 and 580,849.

United States Patent Office 3,164,559
Patented Jan. 5, 1965

3,164,559
PROCESS FOR PREPARING FRAGMENTS OF A FOAMED UREA-FORMALDEHYDE RESIN
James J. Eberl, Moylan, and Sydney Coppick, Ridley Park, Pa., assignors to Scott Paper Company, Philadelphia, Pa., a corporation of Pennsylvania
No Drawing. Filed May 10, 1961, Ser. No. 109,020
3 Claims. (Cl. 260—2.5)

The present invention relates to foamed aminoplast resins and more particularly to residual products of partially disintegrated aminoplast resin foams which will possess physical characteristics admitting of a more general utilization thereof.

Foamed products based upon urea-formaldehyde resin condensates have assumed considerable commercial significance during the past few years. These resin foams possess a high insulation value and can be obtained in structural forms varying from soft and flexible to rigid bodies. For many applications, it is preferred to reduce the resin foam into smaller segments, particulate agglomerates which are more readily distributed through or combinable with other materials, as for example, fibers of cellulosic and synthetic resinous materials, mineral fillers and the like. It has been observed, however, that under fragmentization the more rigid forms of resin foams result in an unduly high percentage of minute particles or granules which exhibit little or no mechanical bonding attraction for the fibrous substances with which they are to be combined. Additionally, attempted reduction of the more flexible and resilient foams has been equally unsatisfactory in that the foam structure possesses such elasticity that the customary fragmentization or milling operations are ineffective.

It is an object of the present invention to provide a process of fragmentizing aminoplast resin foams which will achieve uniform material disintegration with a minimum of mechanical effort.

A further object of our invention is to provide a process in which a preliminary conditioning of a foamed aminoplast resin renders such material more suitable for fragmentization.

A further object of the present invention is to provide a process of foamed resin fragmentization in which the physical properties of the ultimate fragments are significantly altered.

Other objects and advantages of our invention will be readily apparent from the following detailed description of certain preferred embodiments thereof.

It is known that a urea-formaldehyde prepolymer formed by condensing urea and formaldehyde in an approximate 1 to 2 molar ratio may be formed by addition to a cellulated mass of a surface active agent, water and an acid catalyst such as sulfuric acid. Regulation of the density of the cellulated matrix by aeration thereof enables control of the density of the resin foam within limits of from 0.2 to 0.8 pound per cubic foot. It has also been noted that the degree of aeration and matrix agitation affects the fineness of the ultimate foam which may be as many as $10^5$ cells per cubic centimeter. The foam following its formation is cured to result in a reticulated structure whose skeletal configuration is composed of rodlike strands arranged in a three-dimensional network of unique geometry with intervals between the strands corresponding to spacial dimensions with the initial foam. Melamine formaldehyde resins, mixed melamine urea thiourea condensation products with formaldehyde and phenol-formaldehyde resins may be similarly processed to produce comparable lightweight foams. Other foam resins are disclosed in U.S. Patents Nos. 2,076,295, 2,273,367, 2,384,387, 2,559,891 and 2,813,780, British Patent No. 768,762, Italian Patent No. 590,887, Belgian Patents Nos. 527,694, 565,130 and 580,849.

The foamed resins described above are flexible and resilient but compression to the extent that their volume is reduced by approximately 50% at a temperature in excess of 150° F. and preferably within the range of from 150–300° F. effects such densification that this undesirable resilience is substantially eliminated. The compression set at elevated temperatures is applicable not only to the urea-formaldehyde resin foams but also to the phenol formaldehyde, the melamine formaldehyde and the mixed melamine urea-formaldehyde resin foams.

Following the compression step, foam disintegration may be effected by a simple and direct application of commercially available grinding and disintegrating mills and where the optimum conditions of thermal compression set have been realized, a desired form of disintegrated foam fragment automatically results. For many applications, of course, it is essential that the disintegrated foam be classified and to accomplish this the fragments are dispersed in aqueous suspension and screened in the manner well known to those skilled in the art. The graded fragments of foam are collected, dried and are ready for subsequent utilization. In the treatment of a urea-formaldehyde resin foam of the type disclosed in our copending application for Letters Patent of the United States, Serial No. 87,743, filed February 8, 1961, now U.S. Patent No. 3,125,621, the foam after curing is compressed to at least 50% of its original volume, as for example, by subjecting it to pressure between hydraulically activated platens which are heated to a temperature of at least 150° F., and is maintained under this compression until the material is set at its reduced volume. The nature of the compression set is dependent not only upon the chemical composition of the foam per se but also to the degree of compression exerted thereagainst and the operating temperatures to which the compressed foam has been exposed. For most purposes, however, in dealing with urea-formaldehyde resin foams of the general type described and claimed in the above-identified application, a compression set at 50% of the original volume is attainable in 3 minutes at 175° F. Compression sets on more flexible melamine formaldehyde resin foams have required temperatures as high as 225° F. and exposure times as long as 10 minutes.

As a specific illustration of our invention, a foamable, labile urea-formaldehyde prepolymer was prepared according to the teachings of Italian Patent No. 590,887 by the condensation of 2 mols of formaldehyde with 1 mol of urea in the presence of methanol and hexamethylene tetramine. The prepolymer, which had a viscosity of 55 centistokes at 20° C., was diluted and blended with a hardening agent consisting essentially of phosphoric acid in a foaming nozzle and conducted at high velocity over a tortuous path to produce a fine foam in accordance with the method of U.S. Patent No. 2,860,856. The foam was collected in wire mesh containers and placed in an air curing oven with an air circulation rate of 1000 cubic feet per minute for 3 hours at a temperature of 185° F. and a relative humidity of 42%. A moist, cured, reticulated, three-dimensional strand structure containing 67% of residual water was produced. Two inch slabs of this material were compressed between heated platens to about 50% of their original thickness and the compressed foam was maintained at a temperature of 175° F. for a further period of 3 minutes.

The compressed material was shredded and then dispersed in water for disintegration in a Hydropulper. After five minutes of exposure at 15% consistency the material was diluted to 0.5% consistency and centricleaned. The accepted slurry was dewatered to a consistency of 3%, washed with water to remove any residual acid catalyst and further dewatered to a consistency of 15%. Subsequent drying in a forced draft oven at 220° F. produced a dried material containing approximately 5% of residual water. The final angulate product was quite stable and was in an amorphous state, permitting its combination with both particulate and fibrous materials in the fabrication of resilient cushioning pads when encompassed by suitable wrappers.

To illustrate the advantage potential of our new product when combined with cellulose, the dried angulate disintegrate was blended in a Hydropulper with bleached sulfite pulp from western hemlock in the proportions of one part of angulate disintegrate to one part of wood pulp. The sulfite pulp was previously lightly beaten to a freeness of 600 cc. Canadian Standard.

After deaeration the blended material was fed to a cylinder paper-board machine to prepare a dried sheet with a basis weight of 55 pounds per ream. The paperboard machine was equipped with a Yankee drier and knife blade creping device. Soft, compliant rolls were prepared both in uncreped flat sheet form and in sheets containing 13% crepe. Similar paper-board was prepared on the cylinder machine utilizing the wood pulp alone without the addition of angulate disintegrated foamed product.

Strips of the product ¾ inch wide were cut from the rolls, and further cut into rectangular shapes ⅞ inch long.

These rectangular pads were attached to an adhesive strip to simulate an adhesive absorbent bandage.

The following data was obtained on testing these materials:

*Table I*

|  | Control Wood Pulp Pad (Flat) | 50% Angulate Disintegrate Pad | |
|---|---|---|---|
|  |  | (Flat) | (Creped) |
| Basis Weight (lbs. per ream) | 54.7 | 54.0 | 54.7 |
| Caliper (mils) | 5.8 | 21.2 | 23.1 |
| Specific Volume (cc. per gm.) | 1.59 | 5.88 | 6.33 |
| Machine Direction/Cross Direction: |  |  |  |
| Tensile Strength (oz. per inch) | 296/146 | 38/18 | 22/11 |
| Breaking Length (meters) | 3,570/1,750 | 460/210 | 260/130 |
| Absorbent Capacity—Water (gms. water per gram pad) | 2.03 | 7.78 | 11.3 |
| Absorbency Rate—Water: |  |  |  |
| Uncured (sec. per 0.05 gm. water) | 39.0 | 3.5 | 2.0 |
| Cured (sec. per 0.05 gm. water) | 60.8 | 7.0 | 6.3 |
| Absorbent Capacity—Human Blood (gms. blood per gram pad) | 1.82 | 8.72 | 13.6 |
| Absorbency Rate—Human Blood: |  |  |  |
| Uncured (sec. per 0.06 gm. blood) | 1,300 | 8.3 | 3.5 |
| Cured (sec. per 0.06 gm. blood) | 1,300 | 12.3 | 5.8 |
| Absorbency Capacity—Oil (gms. oil per gm. pad) | 0.98 | 5.30 | 8.34 |
| Absorbency Rate—Oil: |  |  |  |
| Uncured (sec. per 0.06 gm. oil) | 382 | 3.3 | 2.0 |
| Cured (sec. per 0.06 gm. oil) |  | 3.3 | 2.0 |

NOTE.—The cured samples were sterilized at 300° F. for two minutes. Whole blood, type O-positive was used in the above. Refined mineral oil was used for the oil absorbency tests.

From the above results it is apparent that the angulate disintegrate prepared via the specifications of this invention may be incorporated into sheeted or felted pad-like materials to produce a soft, bulky pad with improved absorbent properties for water, blood and oil. Both absorbent capacities and absorbency rates are improved substantially by the addition of the product of this invention.

It will also be obvious that various types of surface modifying agents may be combined with a disintegrated foam product during its classification and washing in order to affect the physical properties of the final product. For example, surfactants such as the long chain fatty acid amids can be deposited on the disintegrate and will assist in redispersion of the product in water. Glycerol or other polyhydric alcohols can be present in amounts up to about 5% by weight of the finished product to impart greater softness thereto.

Additionally, it will be recognized that the initial disintegration of the compressed foam product may be controlled so as to regulate the degree of fragmentization accomplished. Furthermore, the disintegrated resin foam may be separated or classified as to size and/or general particulate configuration and the several groups of angulate fragments treated and handled individually during the washing and drying operations. Particles of such size that they will pass through a 150 mesh screen will be readily applicable as lightweight aggregate filling material. Fragments retained on a 150 mesh screen have been determined to embody special geometry adapting them for admixture with uni-axial cellulosic fibers in the preparation of filled paper products.

What we claim is:

1. A process for preparing fragments of foamed urea-formaldehyde resin structure comprising the steps of:
    (a) compressing the resin foam
    (b) shredding the compressed foam structure
    (c) forming an aqueous suspension thereof
    (d) milling the aqueous suspension
    (e) effecting a partial disintegration of the resin foam contained therein
    (f) classifying in a centricleaning zone the disintegrated product to eliminate therefrom granular particles and oversize residues
    (g) collecting the centricleaned product having a mesh size of from about 48 to about 150 and thereafter drying the separated fragments.

2. A process of fragmentizing a foamed urea-formaldehyde resin structure which comprises the steps of compressing the resin foam thermally setting the compressed resin foam, shredding the foamed structure, forming an aqueous suspension thereof, milling such aqueous suspension to effect a partial disintegration of the resin foam contained therein, classifying the disintegrated product to eliminate therefrom granular particles and oversize residues, collecting the angulate fragments contained on screens of mesh density varied between 48 and 150 and thereafter drying the separated fractions.

3. A process as defined in claim 2 in which the resin foam is compressed to approximately 50% of its initial thickness and thermally set at such compression prior to disintegration.

References Cited in the file of this patent

UNITED STATES PATENTS

| 2,016,199 | Howald | Oct. 1, 1935 |
| 2,384,387 | Meyer | Sept. 4, 1945 |
| 3,038,867 | Czepiel | June 12, 1962 |
| 3,047,538 | Steinmann | July 31, 1962 |
| 3,063,953 | Eberl | Nov. 13, 1962 |